April 30, 1929.  W. J. HINES  1,711,412
DRESSER TRAY
Filed Jan. 8, 1927
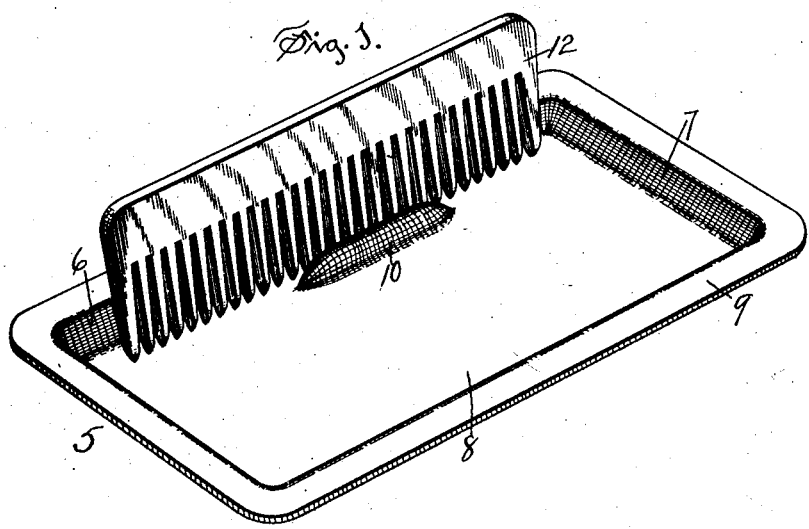
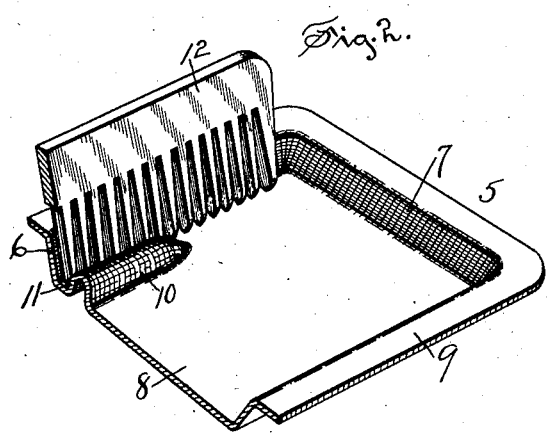
INVENTOR
William J. Hines,
by
Arthur B. Jenkins,
ATTORNEY Patented Apr. 30, 1929.

1,711,412

UNITED STATES PATENT OFFICE.

WILLIAM J. HINES, OF HARTFORD, CONNECTICUT, ASSIGNOR TO THE FULLER BRUSH COMPANY, OF HARTFORD, CONNECTICUT, A CORPORATION OF CONNECTICUT.

DRESSER TRAY.

Application filed January 8, 1927. Serial No. 159,936.

My invention relates more especially to devices for holding toilet articles, as brushes, combs, and the like, and an object of my invention, among others, is the production of a tray provided with means for holding a comb in an upright position.

One form of tray embodying my invention and in the construction and use of which the objects herein set out, as well as others, may be attained, is illustrated in the accompanying drawings, in which—

Figure 1 is an isometric view of a tray embodying my invention.

Figure 2 is a similar view in crosswise section through the tray, a comb resting therein.

In the accompanying drawings the numeral 5 indicates a tray that may be composed of any suitable material, as celluloid, this tray being of dish shape to provide sides 6 and end walls 7 preferably diagonally arranged with respect to the bottom 8 and with a flange 9 extending about the upper edge of the tray.

A holder 10 projects upwardly from the bottom 8 in a position spaced from one of the side walls 6, and as shown in Figure 1 of the drawings. This holder is preferably formed integral with the bottom, and as shown in Figure 2 and the back edge 11 is so disposed with respect to the adjacent side wall 6 that a comb 12 may be readily supported in the space between the holder and the side wall, preferably with the teeth of the comb resting upon the bottom of the tray, and as shown in the figures of the drawing, this space being of a width substantially that of the width of the teeth of the comb so that the latter will be firmly held in place and will not be easily displaced by reason of a tipping action, owing to the extent that the back of the comb projects beyond the upper edge of the side 6 and flange 9.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A tray comprising a bottom with a side wall projecting upwardly therefrom, said bottom being clear and unobstructed except for a holder of less height than said wall projecting upwardly from said bottom at one side thereof and located to provide a narrow space between the holder and side wall for the reception of a comb.

2. A tray comprising a bottom with a side wall projecting upwardly therefrom, said bottom being clear and unobstructed except for a holder of less height than said wall integrally formed with said bottom and projecting upwardly at one side thereof and at a short distance from said side to provide a space for the reception of a comb standing on edge on said bottom.

3. A tray comprising a bottom with a side wall projecting upwardly therefrom, and a holder of less height than said wall projecting upwardly from said bottom at one side and substantially in the lengthwise center thereof and spaced from the ends of the tray, and also spaced from said side wall to form a narrow groove for the reception of a comb.

4. A tray comprising a bottom with a side wall projecting upwardly therefrom, and a holder of less height than said wall formed by pressing up a ridge from said bottom at substantially the lengthwise center thereof and spaced from the ends, and also spaced from said side wall to form a narrow groove for the reception of a comb.

WILLIAM J. HINES.